United States Patent

Tajiri et al.

[15] 3,671,664

[45] June 20, 1972

[54] COLOR TELEVISION IMAGE PICK-UP DEVICES

[72] Inventors: Hisao Tajiri, Sagamihara-shi; Ituzo Sato; Yasuo Takemura, both of Kawasaki-shi; Shigeo Tsuji, Fujisawa-shi, all of Japan

[73] Assignee: Tokyo Shibaura Electric Co., Ltd., Kawasaki-shi, Japan

[22] Filed: Nov. 14, 1968

[21] Appl. No.: 775,825

[30] Foreign Application Priority Data

| | | |
|---|---|---|
| April 19, 1968 | Japan | 43/25446 |
| Nov. 16, 1967 | Japan | 42/73370 |
| Nov. 27, 1967 | Japan | 42/75641 |
| Nov. 14, 1967 | Japan | 42/72767 |

[52] U.S. Cl. .......... 178/5.4 ST
[51] Int. Cl. .......... H04n 9/08
[58] Field of Search .......... 178/5.4 ST

[56] References Cited

UNITED STATES PATENTS

| | | | |
|---|---|---|---|
| 2,908,835 | 10/1959 | Weimer | 178/5.4 |
| 3,001,012 | 9/1961 | Braicks | 178/5.4 |
| 3,087,985 | 4/1963 | Heijne et al. | 178/5.4 |
| 3,300,580 | 1/1967 | Takagi et al. | 178/5.4 |
| 3,407,265 | 10/1968 | Krause | 178/5.4 |

*Primary Examiner*—Richard Murray
*Assistant Examiner*—Alfred H. Eddleman
*Attorney*—Flynn and Frishauf

[57] ABSTRACT

In a color television image pick-up device the light received through an objective lens is divided to follow two discrete paths, a part of the light being supplied to a brilliance image pick-up and the other part of the light being supplied through a Magenta filter to a chromaticity image pick-up tube including a stripe filter formed on the inner surface of a face plate and consisting of alternate monochromatic portions of red or blue color and transparent portions, thus obtaining color television signals from the output from two image pick-up tubes.

4 Claims, 11 Drawing Figures

PRIOR ART

COLOR TELEVISION IMAGE PICK-UP DEVICES

BACKGROUND OF THE INVENTION

This invention relates to a color television image pick-up device and more particularly to a color television image pick-up device including an image pick-up tube having a stripe filter provided with a monochromatic portion and a transparent portion on the inner surface of a face plate.

In a conventional color television camera having a stripe filter (hereinafter abbreviated as CTV), the image is focused on a stripe filter 1 consisting of red (R), green (G) and blue (B) filters which are arranged in a stripe and the image is then focused on a photoelectric converting surface of an image pick-up tube 3, as diagrammatically shown in FIG. 1. With this arrangement a high degree of manufacturing technique is required in order to produce colored stripes of R, G and B, thus increasing the cost of such an RGB colored stripe filter 1. Moreover, where such an RGB colored filter 1 is incorporated in an optical system, it is necessary to use a relay lens 2 thus complicating the optical system. According to another prior CTV camera, instead of utilizing a relay lens the face plate of an image pick-up tube 3 is comprised by a fiber optics 4 and a stripe filter 1 is mounted thereon, as shown in FIG. 2. Utilization of such a fiber optics results in a loss of light quantity as well as in the degration of resolution. In addition, manufacture of fiber optics requires a high degree of skill.

It is therefore an object of this invention to provide a new and improved CTV image pick-up tube having a stripe filter therein and can be simply fabricated.

A further object of this invention is to provide a method of manufacturing a CTV image pick-up tube having a stripe filter therein and which can be readily fabricated.

A still further object of this invention is to provide a new and improved CTV image pick-up tube having a simplified optical system.

Another object of this invention is to provide a novel CTV image pick-up device wherein the focal point of the image pick-up tube can be automatically controlled.

SUMMARY OF THE INVENTION

According to this invention there is provided a CTV image pick-up device comprising means to divide light received through an objective lens into two parts which run two discrete paths; a brilliance image pick-up tube arranged to receive the light following one path to provide brilliance signals; a Magenta filter supplied with the light following the other path; a chromaticity image pick-up tube adjacent said Magenta filter, said chromaticity image pick-up tube including a target comprising a face plate provided on one end of a vacuum vessel to receive light, a stripe filter formed on the inner surface of said face plate and including alternate monochromatic portions and transparent portions, a transparent conductive film coated upon said stripe filter, and a photo-electric conversion surface arranged to receive the light transmitted through said stripe filter; means to derive an electrical signal corresponding to incident light from said photoelectric conversion surface by means of a scanning electron beam; and means to obtain color television signals from the output signals of said two image pick-up tubes.

DESCRIPTION OF THE PREFERRED EMBODIMENTS

Figure 1:
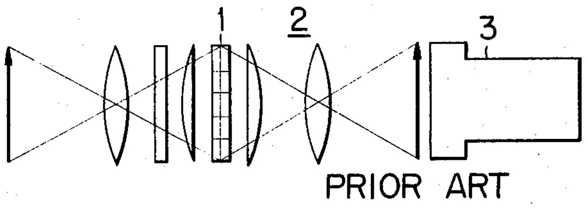
PRIOR ART FIG. 1
FIG. 1 is a diagrammatic representation of one example of the prior art color television image pick-up device.
Figure 2:
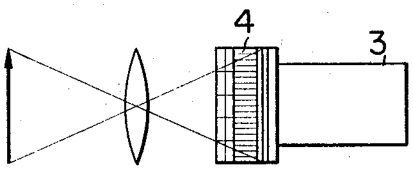
FIG. 2 is a similar view of another prior art color television image pick-up device.
Figure 3:
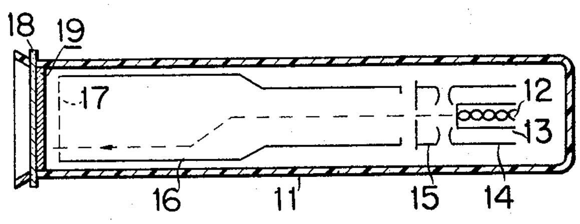
FIG. 3 is a longitudinal sectional view of a color television image pick-up tube embodying this invention.

One example of the novel image pick-up tube will now be described with reference to FIGS. 3 to 5 of the accompanying drawings, wherein FIG. 3 shows a longitudinal section of a vidicon. While the general operation and construction of electrodes of this vidicon are generally the same as those of a conventional vidicon, the vidicon shown in FIG. 3 is characterized by its special target. More particularly, at one end of a vacuum envelope 11 there are provided a heater 12, a cathode 13, a first cylindrical grid electrode 14, a second cylindrical grid electrode 15 and a third cylindrical grid electrode 16 in the same manner as in the conventional vidicon. A field mesh 17 is secured to one end of the third grid electrode 16 to constitute an electron gun. On the inner surface of a face plate 18 on the other end of the vacuum envelope 11 there is provided a target 19 in close proximity of field mesh 17.

Figure 5:
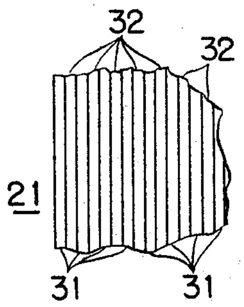
FIG. 5 is a plan view of the portion of the target shown in FIG. 4.
Figure 4:
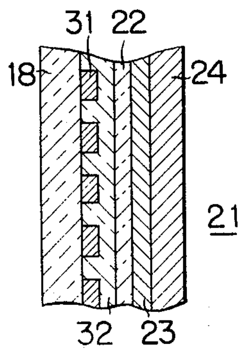
FIG. 4 is an enlarged sectional view of a portion of a target employed in the pick-up tube shown in FIG. 3.

The target 19 is constructed as shown in FIGS. 4 and 5. More specifically, on the inner surface of face plate 18 are provided a color stripe filter 21, a thin transparent glass sheet 22, a transparent conductor layer 23 which acts as a signal electrode and a photoconductor layer 24, in the order mentioned, thus constituting the target 19. Different from the conventional color filter, the color stripe filter 21 is not comprised by many types of color filters. Thus, on the basis of a conception that information corresponding to a green filter approximates brilliance signals, according to this invention any green filter is not utilized and monochromatic portions 31 of blue or red color and transparent portions 32 are combined in the form of a stripe whereby the color stripe filter 21 which is termed "chromicon" is formed.

One method of fabrication of the target 19 is as follows:

1. After cleaning the surface of the face plate 18 by washing, a red or blue stripe is formed thereon by photoetching technique or by using a striped mask. More specifically, at least two substances are selected from the group of light transmissive substances having different refraction indices, such as magnesium fluoride, cerium oxide, zinc sulfide, etc. and the selected substances are alternately laminated to form a stripe filter including monochromatic portions 31 and transparent portions 32. The number and width of the stripe are selected such that the resulted filter acts as an interference filter and manifests the required analyzing and light transmitting characteristics.
2. A light transmissive glass 22 is mounted upon the stripe filter 21 thus obtained, and the light transmissive glass is covered by a transparent conductive film. If desired, the light transmissive glass may be omitted. Usually, as the transparent conductive film use is made of a tin oxide film which is commonly known as "Nesa" (registered trade mark) which is formed by spraying an ethyl alcohol solution containing stannic chloride (to which a small quantity of antimony chloride may be added in some cases) onto a substrate heated to a temperature of 500° C, for example. However, the tin oxide film deposited in this manner on the stripe filter has a tendency to peel off or manifest analyzing and transmissive characteristics different from desired characteristics. Thus, such Nesa films failed to provide satisfactory signal electrodes.

I have now discovered the following methods to solve this problem.

The first method involves a vacuum deposition technique. Thus, aluminum is vapor deposited on said stripe filter to a thickness of about 50 to 1000 A. Such deposition can be readily made by passing current through a tungsten wire around which an aluminum foil is wrapped. While aluminum can be substituted by a heavy metal such as gold or silver aluminum seems best because of its transparency and electroconductivity.

The second method involves a sputtering technique. As an example, a sealed vessel is filled with an inert gas at a pressure of $10^{-3}$ mm Hg and a cathode electrode comprising a platinum sheet and an anode electrode comprising a metal sheet to which the glass plate on the stripe filter is brought into intimate contact are disposed in the vessel. Dimensions of the platinum sheet may be $15 \times 15$ cm$^2$, those of the metal sheet may be $20 \times 20$ cm$^2$ and the distance between them may be 15 cm. Under these conditions a voltage of 1500 V is impressed across two electrodes to sputter platinum on the anode, that is the stripe filter. Platinum films of 50 to 900 A thick show sufficient conductivity as well as very good light transmitting property.

3. After finishing the above described process steps, a photoconductor, for example, antimony trisulfide or lead oxide, is deposited upon the transparent conductive film by vapor deposition, for example. In the case of antimony trisulfide, successive layers of a porous layer and a solid layer; or of a solid layer, a porous layer and a solid layer are laminated upon the transparent conductive film. The term "porous layer" herein used means a layer consisting of relatively coarse particles which are vapor deposited under a relatively low vacuum whereas the term "solid layer" designates dense or glassy layer consisting of very fine particles which are vapor deposited under a high vacuum. As the methods of forming such porous and solid layers are well known in the art it is considered unnecessary to described it in detail. On the other hand lead oxide is formed to have an n–i–p diode construction or as a multilayered construction with their interfaces acting as electric barriers to decrease dark current. It is to be understood that many other modifications or photoconductor layers having required analyzing sensitivity may be made.

Photoconductors may be substituted by photo-electron emissive substances. Examples of these substances are antimony-cesium, and silver-bismuth multi-alkaline photosensitive surfaces.

The target fabricated in this manner is applied to the vidicon shown in FIG. 3 to complete a CTV image pick-up tube. With this image pick-up tube, an image of an object is focused upon the color stripe filter through an objective lens, not shown, and the light transmitted through the monochromatic (for example red) portions and transparent portions of the stripe filter impinges upon the photoconductor surface through the signal electrode, thus exciting the photoconductor surface. The excited photoconductor converts the color information into electric signals of a time function when it is scanned by an electron beam emanating from the electron gun. Thus, it is possible to obtain discrete color signals by frequency separating means or a time gate means.

As above described, this invention can obviate the above described defects by providing a novel CTV image pick-up tube comprising a vacuum envelope, a color stripe filter contained in said envelope and including a stripe of one color filter, a photoelectric converting surface disposed in the envelope to receive the light transmitted through the stripe filter and means to derive electric signals that have been converted by the converting surface by electron beam scanning.

The novel CTV image pick-up tube is advantageous in the following points:

1. The color stripe filter can be readily manufactured because it is only necessary to successively arrange filters of one color in the form of a stripe. Thus the percentage of acceptable products can be increased with reduction in cost.

2. As no special and difficult manufacturing technique is involved, the novel pick-up tube can be produced on a mass-production basis.

While the above described embodiment refers to a vidicon, it is to be understood that this invention is applicable to any type of electron tube, typically an image orthicon, which can convert light signals into electric signals and can derive electric signals by means of a scanning electron beam.

For example, the novel color stripe filter including a stripe of filters of one color may be interposed between a face plate and a photoelectric converting surface of an image orthicon. With this arrangement the light transmitted through the color stripe filter is converted into electrical signals by the photoelectric surface, photoelectrons are focused on the target at the image section and electrical signals on the target can be derived by scanning the target with an electron beam.

In the above described example, by forming the color stripe filter to have a square configuration to correspond to the scanning area of the scanning electron beam so as not to form a color filter on the periphery of the face plate, the risk of peeling off of the color filter at the peripheral edge portion at the time of fabrication can be avoided.

Figure 7:
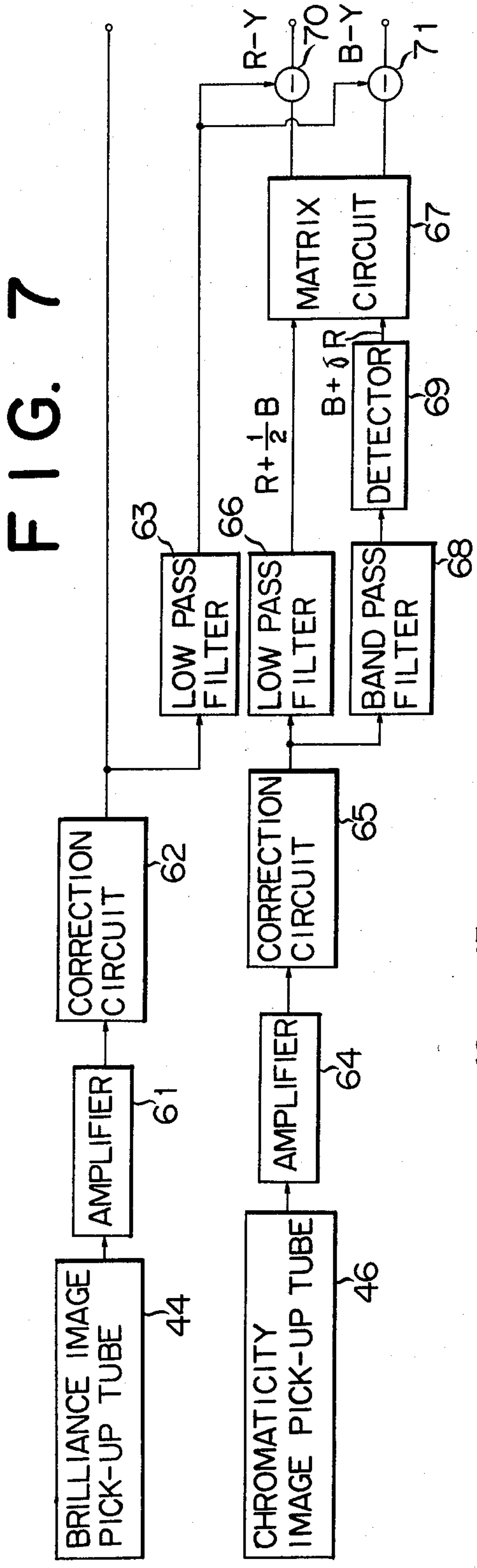
FIG. 7 shows a block diagram of the image pick-up device shown in FIG. 6.
Figure 6:
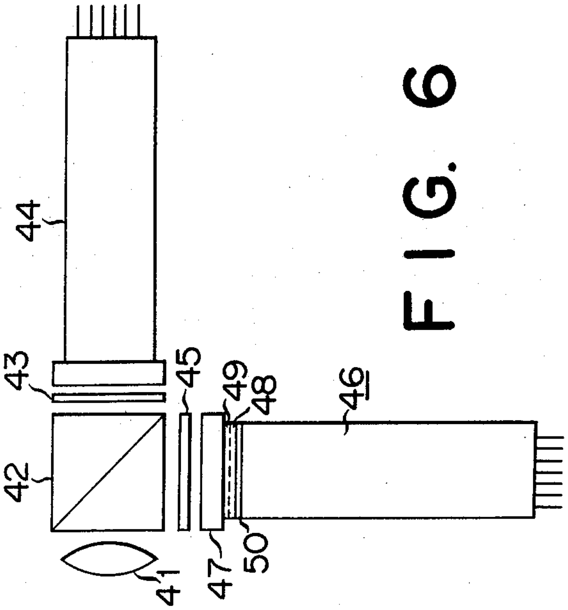
FIG. 6 is a diagrammatic representation of one example of a color television image pick-up device embodying the principle of this invention.

FIGS. 6 and 7 show an example of an image pick-up device utilizing the novel image pick-up tube shown in FIGS. 3 to 5 as a chromaticity image pick-up tube.

Light impinging upon an objective lens 41 is divided into two paths or portions by means of a half-mirror 42, one portion being focused on a photoconductor surface of a brilliance pick-up tube 44, for example, a well known vidicon through a brilliance filter 43, while the other portion being focused on a photoconductor surface 50, through a Magenta filter 45 which transmits uniformly only blue or red, of a vidicon wherein a monochromatic stripe filter 49 of red or blue, for example, is interposed between a face plate 47 of a chromaticity image pick-up tube, for example a vidicon and a signal electrode 48.

More specifically, when an optical image from the half-mirror 42 is projected upon the Magenta filter 45 which transmits red and blue light and when a red stripe filter is used in the chromaticity image pick-up tube 46 a mixed image resulted from the Magenta filter and the red stripe filter will be formed on the photoelectric converting surface of the chromaticity image pick-up tube 46. Further as the transmission of the stripe filter is not uniform, there exists a difference in light energy between transparent and red portions of the strip for deep red color thus modulating the output which is required to be compensated for.

The connection diagram of the image pick-up device shown in FIG. 6 is shown in FIG. 7.

More specifically, the output from the brilliance signal image pick-up tube 44 is coupled to a correction circuit through an amplifier 61. The output from the correction circuit is divided into two parts, one being connected to the output terminal of the brilliance signal whereas the other to the input of a low pass filter 63.

The output terminal of the chromaticity image pick up tube, or a vidicon 46 having red colored stripe filter is coupled to a correction circuit 65 via an amplifier 64. The output from the correction circuit 65 is divided into two parts, one being coupled to a matrix circuit 67 through a low pass filter 66 while the other to the same matrix circuit through a band pass filter 68 and a detector 69.

The red signal output from the matrix circuit 67 is connected to an output terminal through a differential amplifier 70 while the blue signal output is connected to an output terminal through a differential amplifier 71.

The output from the low pass filter 63 is coupled to said differential amplifiers 70 and 71.

The device shown in FIGS. 6 and 7 operates as follows:

An optical image of an object (not shown) is focused on the photoconductor surfaces of brilliance pick-up tube 44 and of chromaticity pick-up tube 46 through objective lens 41 and half-mirror 42. In the optical path to the focal plane are provided a brilliance correcting filter 43, a Magenta filter 45 and a red stripe filter 49.

As a result, the optical image which has transmitted through the brilliance correcting filter 43 is converted into electrical signals by the brilliance image pick-up tube 44 in accordance with the well known television scanning technique. Red component and blue component alone of the light image are transmitted through the Magenta filter 45. Transmitted light impinges upon red stripe filter 49 on the face plate 47 of the vidicon. As filter 49 comprises a stripe of red filter portions and transparent portions, when passing through the color stripe filter 49, the light transmitted through the Magenta filter 45 impinges upon the photoconductor surface 50 of vidicon 46 with a component proportional to the energy of red and blue lights and a component proportional to the energy of red light alone. By scanning the photoconductor surface 50 with an electron beam in a manner well known in the art a vidicon output can be obtained consisting of alternate electric signals of an optical image proportional to red and blue and of an optical image proportional to the energy of red only. As a result the red light in the low frequency component which is made insensitive to the deviation of these signals caused by the color stripe always comprises the transmitted light and has sensitivity over its entire energy, whereas blue light provides an output corresponding to one half of the energy. In the high frequency component, however, the difference between an instantaneous value of red and blue and that of red appears as the amplitude so that signals of blue light alone are produced.

In this case, however, as some portion of the red light passes the filter twice and the remainder only once, there is a difference between their outputs thus mixing red signal in the high frequency component. Although this red signal has a small value $\delta$, a signal as shown in FIG. 8 is obtainable as the output from the chromaticity image pick-up tube.

Since the value of $\delta$ is constant, it is possible to obtain red and blue signals by the matrix circuit 67 shown in FIG. 7.

Figure 8:
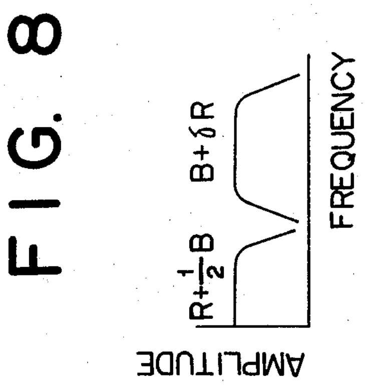
FIG. 8 shows a graph helpful to explain the operation of the image pick-up device shown in FIGS. 6 and 7.

Thus the output signal as shown in FIG. 8 from the chromaticity vidicon 46 is amplified to a desired value and is then corrected its frequency characteristic and gas characteristic by a correction circuit 65 in the same manner as the well known vidicon output. Then, the signal having a frequency distribution as shown in FIG. 8 is supplied to a low pass filter 66 and a band pass filter 68.

Low pass filter 66 passes a signal component $R + \frac{1}{2}B$ in the low frequency band shown in FIG. 8 whereas band pass filter 68 passes a signal component $B + \delta R$ in the high frequency band. Color signals respectively passed through filters 66 and 68 are supplied to the matrix circuit 67 but the component $B + \delta R$ in the high frequency band is supplied to the matrix circuit after being detected by a detector 69. The matrix circuit performs the following operation of the primary transformation:

Assuming now that $$E_L = R + \tfrac{1}{2}B$$
$$E_H = \delta R + B$$

then $$B = \frac{E_H - \delta E_L}{1 - \frac{\delta}{2}}$$

$$R = \frac{E_L - \frac{1}{2}E_H}{1 - \frac{\delta}{2}}$$

This operation is performed by the matrix circuit to obtain red and blue signals. These color signals are supplied to differential amplifiers 70 and 71 respectively which amplify differences between a low frequency component of the brilliance output signal $Y$ from the brilliance vidicon 44 and said color signals R and B to produce output color signals $R - Y$ and $B - Y$ respectively.

Thus according to this embodiment there is provided a color television image pick-up device comprising an image pick-up device for producing brilliance signals, an image pick-up tube having a monochromatic color stripe filter on the photoelectric conversion surface in a vacuum envelope and means to produce color television color signal from the output signal from the image pick-up tube.

The optical system of the conventional color television image pick-up device has a long light path and of complicated construction since it utilizes a relay lens. However, according to this invention, it is possible to simplify the optical system. For as it is possible to omit the relay lens it is possible to improve such characteristics as the ambient light quantity, the limit for the objective lens opening, and a loss of light quantity, etc.

This invention further provides inexpensive color cameras of small size and light weight because of simplified yet high quality optical system thus greatly contributing to widespread use of color video tape recorders and outdoor use of color cameras.

In the above embodiment, a vidicon was used for the image pick-up device it is to be understood that any other suitable converting device that can convert light signals into electric signals may be used such as an image orthicon.

While a half-mirror disposed in the path of light passing through an objective lens was used to divide the light into two paths, any other means that can divide the light into two paths, can also be used such as a dichroic prism. When a dichroic prism is used in the above described embodiment as the light quantity is effectively utilized it is possible to omit the correcting filter 43 and the Magenta filter 45 or to use more simple ones.

As one example of the application of the image pickup device utilizing the image pick-up tube shown in FIGS. 3 to 5, the following embodiment is given wherein the focal point of an electronic lens system is adjusted by automatically adjusting the voltage of a collector electrode such that the high frequency output will be the maximum.

This can be accomplished by providing a control circuit for the embodiment shown in FIGS. 6 and 7, which adjusts the voltage of the focusing electrode such that the high frequency output will be the maximum.

Figure 9:
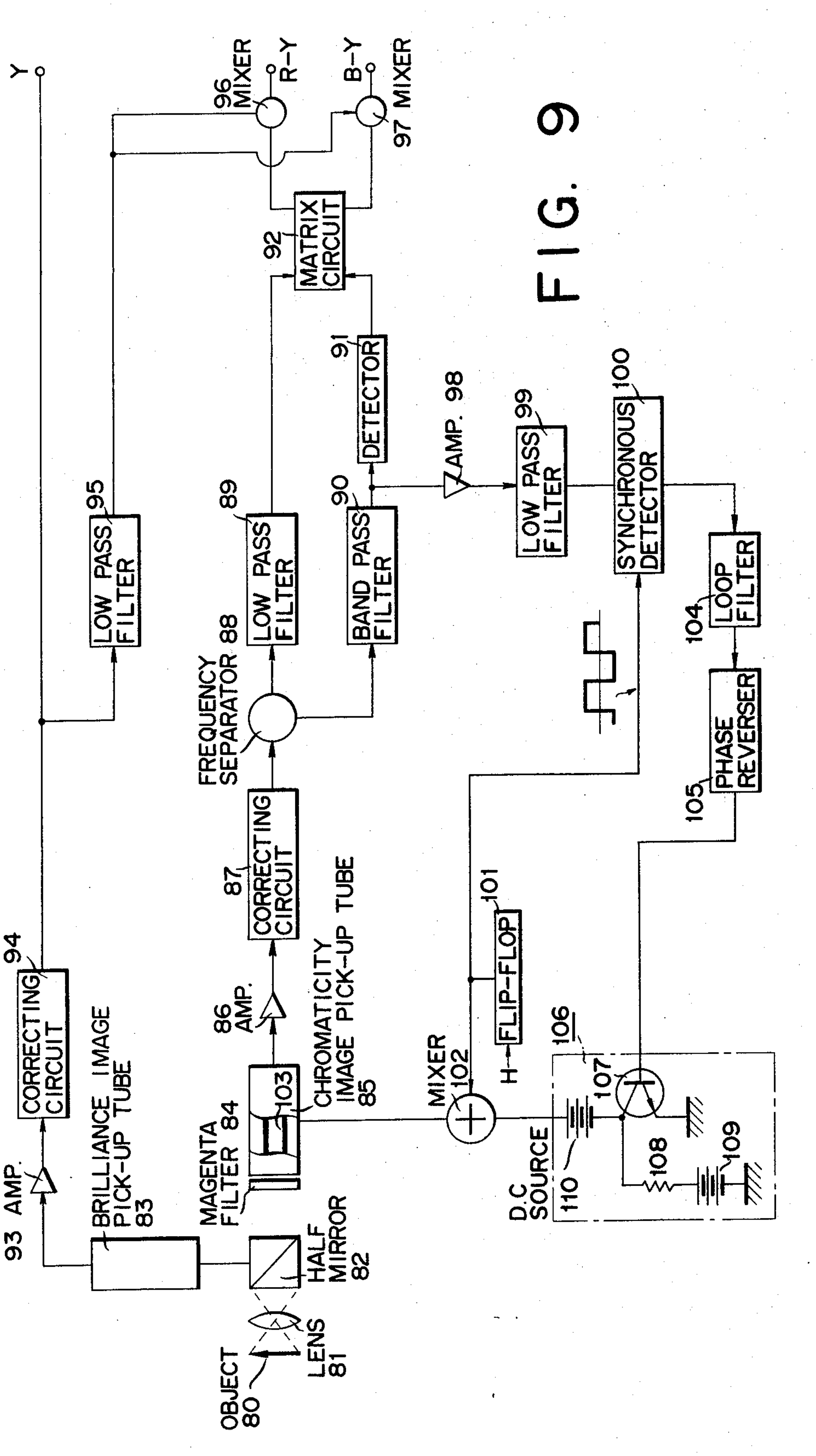
FIG. 9 shows a connection diagram of one application of the novel color television image pick-up device.

The detail of this application will be described hereunder with reference to FIGS. 9 and 10. A light image of an object 80 is projected upon a half-mirror 82 through an objective lens 81 to be divided into two paths, one being focused on a photoelectric surface of a brilliance image pick-up tube 83 while the other being focused through a Magenta filter 84 on the photoelectric surface of a chromaticity pick-up tube 85 containing a stripe filter embodying this invention. Output signals from the chromaticity image pick-up tube are the so-called frequency separated signals in which the signal component $R + B/2$ lies in the low frequency band and the signal component B in the high frequency band. These outputs signals are supplied to a frequency separator 88 through an amplifier 86 and a connecting circuit 87. Signal component $R + \frac{1}{2}B$ divided through a low pass filter 89 and signal component divided through a band pass filter 90 are supplied to a detector 91. Thereafter these signal components $B$ and $R + \frac{1}{2}B$ are operated by a matrix circuit 92 to provide B and R output signals. The Y output from the brilliance image pick-up tube 83 is coupled to a low pass filter 95 through an amplifier 93 and a correcting circuit 94 and is then supplied to respective mixers 96 and 97 corresponding to $R$ and $B$ signals, respectively to form $R - Y$ and $B - Y$ color television signals.

The output component (the output obtained at the time of impressing a search voltage to be described later) from the band pass filter 90 is coupled to a synchronous detector 100 via an amplifier 98 and a low pass filter 99 to be detected in synchronism with the search voltage from a flip-flop circuit 101. This search voltage signal supplies a horizontal synchronizing signal H to flip-flop circuit 101 and takes a rectangular waveform which becomes positive or negative at each horizontal synchronizing signal. This search voltage signal is impressed upon the synchronous detector 100 and also upon a focusing electrode 103 of the image pick-up tube 85 via a mixer 102.

The output from the synchronous detector 100 is applied to a phase reverser 105 via a loop filter 104 to reverse its phase and is then applied to the base electrode of an N-P-N type transistor 107, for example, of a focusing electrode source circuit 106. This source 106 includes a DC source 109 with one end grounded and the other end connected to the collector electrode of transistor 107 via resistor 108, the emitter electrode of the transistor being directly grounded. Further, the collector electrode is connected to mixer 102 via a DC source 110. The output from the phase reverser 105 is coupled to the focusing electrode 103 of the image pick-up tube 85 via transistor 107, DC source 110 and mixer 102.

Figure 10A:
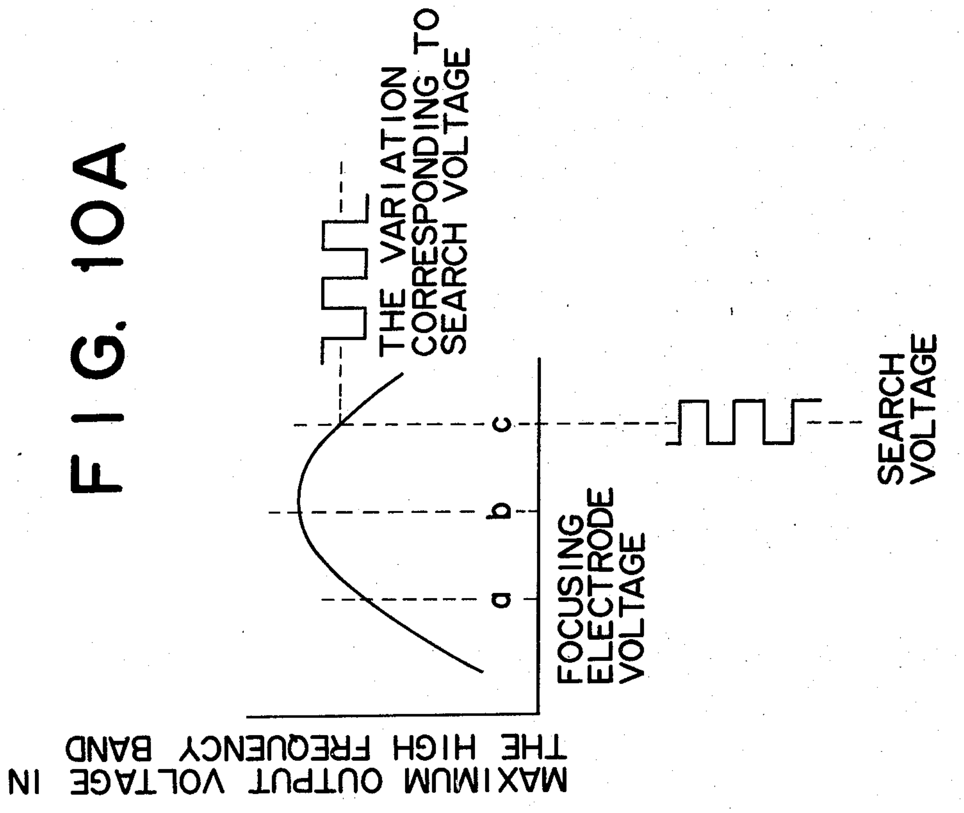
FIGS. 10A and 10B are curves to explain the operation of the device shown in FIG. 9.
Figure 10B:
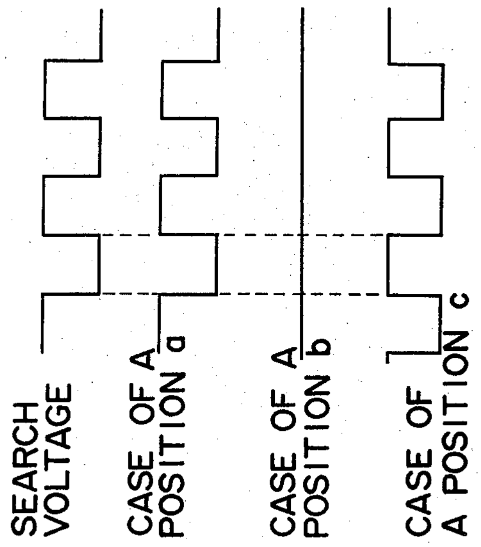

A search voltage signal of rectangular waveform generated by the flip-flop circuit is supplied to the focusing electrode 103 through mixer 102. If, as shown in FIGS. 10A and 10B, the focusing electrode voltage assumes a position *a* at which the focusing electrode voltage is lower than the voltage corresponding to the maximum output voltage in the high frequency band, the phase of the output from the image pick-up tube 85 will be the same as that of the search voltage output from the flip-flop circuit 101. Whereas when the focusing electrode voltage assumes a position *c* beyond a position *b* corresponding to the maximum output voltage, the phase of the output from the pick-up tube 85 will be reverse to that of the search voltage output from the flip-flop circuit 101. At the position *b* corresponding to the maximum focusing electrode voltage, no output responsive to the rectangular search voltage is provided from the pick-up tube. When rectangular output voltage which is the same or opposite phase with respect to the search voltage signal is derived from the pick-up tube 85, this output is supplied to a low pass filter 99 via separator 88, band pass filter 90 and amplifier 98. Then the energy of the rectangular wave signal is averaged over one period of the horizontal synchronizing signal (one period of the search voltage) and the signal is then supplied to the synchronous detector 100 to be detected by the search voltage from flip-flop circuit 101. Thus, the synchronous detector compares the phase of the rectangular wave signal and that of the search signal voltage and provides a positive voltage when they are in phase but a negative voltage when they are out of phase. The phase of this positive or negative voltage is reversed by phase reverser 105 and is then applied to a source circuit 106 for the focusing electrode. Where both signals applied to the synchronous detector are in phase the voltage applied to the focusing electrode is high whereas when they are out of phase the voltage applied to the focusing electrode 103 is low. When the output in the high frequency band reaches the maximum *b* as shown in FIGS. 10A and 10B as there is no output from image pick-up tube 85 resulting from the search voltage is applied to the synchronous detector 100, this detector does not provide any output whereby the output in the high frequency band will be maintained at the maximum value. Accordingly, occurrence of the so-called out-of-focus condition caused by excessively low or high focusing electrode voltage can be positively prevented thus always assuming satisfactory pictures.

What is claimed is:

1. A color television image pick-up device comprising a vacuum vessel, means to divide light received through an objective lens into two discrete paths; a brilliance image pick-up tube arranged to receive the light following one path to provide brilliance signals; a Magenta filter supplied with the light following the other path; a chromaticity image pick-up tube adjacent said Magenta filter, said chromaticity image pick-up tube including a target comprising a face plate provided on one end of said vacuum vessel to receive light, a stripe filter formed on the inner surface of said face plate and including alternate monochromatic portions and transparent portions, a transparent conductive film coated upon said stripe filter, and a photoelectric conversion surface arranged to receive the light transmitted through said stripe filter; a means to derive electric signal corresponding to incident light from said photoelectric conversion surface by means of a scanning electron beam; and means to obtain color television signals from the output signals of said two image pick-up tubes.

2. A color television image pick-up device according to claim 1 which comprises means to impress a search voltage upon the focusing electrode of said chromaticity signal image pick-up tube to increase or decrease the focusing voltage at each horizontal synchronizing signal, a low pass filter to average the output from said image pick-up tube created by the impression of said search voltage over one search period, a synchronous detector to synchronously detect the averaged output signal by means of said search voltage to provide a control signal, and means responsive to said control signal to impress a predetermined focusing voltage upon said chromaticity image pick-up tube.

3. A color television image pick-up device according to claim 5 wherein said monochromatic portions of said stripe filter are red.

4. A color television image pick-up device according to claim 1 wherein said monochromatic portions of said stripe filter are blue.

* * * * *